(12) United States Patent
Meyerhoefer et al.

(10) Patent No.: US 7,116,779 B1
(45) Date of Patent: Oct. 3, 2006

(54) NETWORK INTERFACE DEVICE FOR HIGH SPEED DATA LINES

(75) Inventors: Carl H. Meyerhoefer, Dix Hills, NY (US); Nisar A. Chaudhry, West Babylon, NY (US); Robert J. Cannetti, Deer Park, NY (US); Peter P. Tabone, Kings Park, NY (US); Thomas J. Smith, Bayshore, NY (US); Peter Arcati, West Babylon, NY (US)

(73) Assignee: TII Industries, Inc., Copiague, NY (US)

( * ) Notice: Subject to any disclaimer, the term of this patent is extended or adjusted under 35 U.S.C. 154(b) by 0 days.

(21) Appl. No.: 08/993,271

(22) Filed: Dec. 18, 1997

(51) Int. Cl.
  *H04M 9/00* (2006.01)
(52) U.S. Cl. ............. 379/412; 379/399.01; 379/413.02
(58) Field of Classification Search ................ 379/412, 379/399, 442, 399.01, 413.02; 361/119, 361/120
See application file for complete search history.

(56) References Cited

U.S. PATENT DOCUMENTS

| 4,616,155 | A |   | 10/1986 | Guichard ..................... 313/573 |
| 4,979,209 | A | * | 12/1990 | Collins et al. .............. 379/399 |
| 5,394,466 | A |   | 2/1995 | Schneider et al. .......... 379/399 |
| 5,416,837 | A |   | 5/1995 | Cote ........................... 379/399 |
| 5,450,469 | A |   | 9/1995 | Pamart et al. ................ 379/27 |
| 5,553,136 | A | * | 9/1996 | Meyerhoefer ............... 379/399 |
| 5,566,056 | A | * | 10/1996 | Chaudhry .................... 361/117 |
| 5,790,363 | A | * | 8/1998 | Chaudhry .................... 361/119 |

OTHER PUBLICATIONS

47 C.F.R. 68.502(e)(2) and 68.502(e)(4), Jan. 9, 1986.*
Cabling Business, Jun. 1997, pp. 74-75.

* cited by examiner

*Primary Examiner*—Jefferey F. Harold
(74) *Attorney, Agent, or Firm*—Morgan & Finnegan, LLP

(57) ABSTRACT

A network interface device for Ethernet networks using unshielded twisted pair cables comprising an overvoltage protection module and an interconnection module connected to the overvoltage protection module, both modules being connected in series in the Ethernet network.

38 Claims, 14 Drawing Sheets

NETWORK INTERFACE DEVICE FOR HIGH SPEED DATA LINES

BACKGROUND OF THE INVENTION

1. Field of the Invention

The present invention relates to network interface devices for Ethernet networks which carry high speed digital signals over unshielded twisted pair cables.

2. Discussion of the Related Art

It is known in the art to provide network interface devices for connecting telephone company lines with subscriber telephone lines and to provide overvoltage protection for the telephone lines. Typical network interface devices are shown in U.S. Pat. No. 5,553,136 issued to Carl H. Meyerhoefer et al on Sep. 3, 1996 (hereafter the "Meyerhoefer '136 patent"), U.S. Pat. No. 4,979,209 issued to Thomas J. Collins et al. on Dec. 18, 1990 (hereafter the "Collins '209 patent"), U.S. Pat. No. 5,450,469 issued to Oliver Parmart et al. on Sep. 12, 1995 and U.S. Pat. No. 5,416,837 issued to Mark P. Cote et al. on May 16, 1995.

It is known in the art to provide network interface devices for connecting coaxial cables. Such network interface devices are shown in the Meyerhoefer '136 patent and in U.S. Pat. No. 5,394,466 issued to Pina Schneider et al on Feb. 28, 1995 (hereafter the "Schneider '466 patent"). It is also known to provide overvoltage protection for coaxial cables. Coaxial cable overvoltage protection devices are shown, for example, in U.S. Pat. No. 4,616,155 issued to Francois Guichard on Oct. 7, 1986 and in U.S. Pat. No. 5,566,056 issued to Nisar A. Chaudhry on Oct. 15, 1996 (hereafter the "Chaudhry '056 patent").

The June 1997 issue of *Cabling Business* contains an article entitled "Cabling For Ethernet (10 Mb), Fast Ethernet (100 Mb) And Gigabit Ethernet" (pages 74–75). It identifies IEEE specification 802.3i (also known as 10BASE-T) and IEEE specification 802.3u (also known as 100BASE-TX) and states that 10BASE-T Ethernet networks handle 10 megabits per second (Mbps) while 100BASE-TX Fast Ethernet networks handle 100 Mbps.

Both 10BASE-T Ethernet and 100BASE-TX Fast Ethernet can be transmitted over unshielded twisted pair ("UTP") wires. One twisted pair is used for incoming digital signals from a source and one twisted pair is used for outgoing digital signals back to the source. In addition, there are categories for classifying horizontal UTP cables and connecting hardware by performance capabilities. Thus, Category 3 encompasses UTP cables and connecting hardware with transmission characteristics up to 16 MHz, Category 4 encompasses UTP cables and connecting hardware with transmission characteristics up to 20 MHz and Category 5 encompasses cables and connecting hardware with transmission characteristics up to 100 MHz. 10BASE-T Ethernet (10 Mbs) can be implemented with Category 3, 4 or 5 cables and connecting hardware, whereas 100BASE-TX Fast Ethernet (100 Mbs) can be implemented with Category 5 cables and connecting hardware.

A need exists for a network interface device for interconnecting Ethernet networks which use unshielded twisted pair cables. A need also exists for a network interface device for interconnecting such Ethernet networks and for interconnecting telephone voice lines and coaxial cables. A need further exists for a network interface device for interconnecting Ethernet networks which use unshielded twisted pair cables and for interconnecting telephone voice lines and coaxial cables and which also provides overvoltage protection for the unshielded twisted pair cables, telephone lines and coaxial cables.

The present invention fills that need by providing a network interface device for interconnecting Ethernet networks which use unshielded twisted pair cables and for interconnecting telephone lines and coaxial cables while, at the same time, providing overvoltage protection for the unshielded twisted pair cables, telephone lines and coaxial cables.

SUMMARY OF THE INVENTION

The network interface device of the present invention provides for interconnecting unshielded twisted pair cables carrying Ethernet signals and comprises an overvoltage protection module having first and second sets of electrical connections and an interconnection module having third and fourth sets of electrical connections. The overvoltage protection module provides overvoltage protection for the unshielded twisted pair cables. The first set of electrical connections are for connecting the overvoltage protection module to the unshielded twisted pair cables connected to the source of the Ethernet signals, while the second set of electrical connections are for connecting the overvoltage protection module to the interconnection module. The third set of electrical connections on the interconnection module are connected to the second set of electrical connections on the overvoltage protection module and the fourth set of electrical connections on the interconnection module are for connecting the interconnection module to the unshielded twisted pair cables connected to the destination of the Ethernet signals.

The network interface device of the present invention also provides for interconnecting telephone company and subscriber voice lines while providing overvoltage protection for those lines and a point of demarcation between the telephone company and subscriber voice lines. Finally, the network interface device of the present invention provides for interconnecting coaxial cables and provides overvoltage protection for the coaxial cables using an in-line coaxial surge arrestor.

The subject matter which we regard as our invention is particularly pointed out in the claims at the end of the specification. Our invention, including its method of operation and its numerous advantages, may best be understood by reference to the following description taken in connection with the accompanying drawings wherein like reference characters refer to like components.

BRIEF DESCRIPTION OF THE DRAWINGS

FIGS. 3A and 3B are end views of an overvoltage protection module according to the principles of the present invention, while

DETAILED DESCRIPTION OF THE PREFERRED EMBODIMENTS

Figure 1:
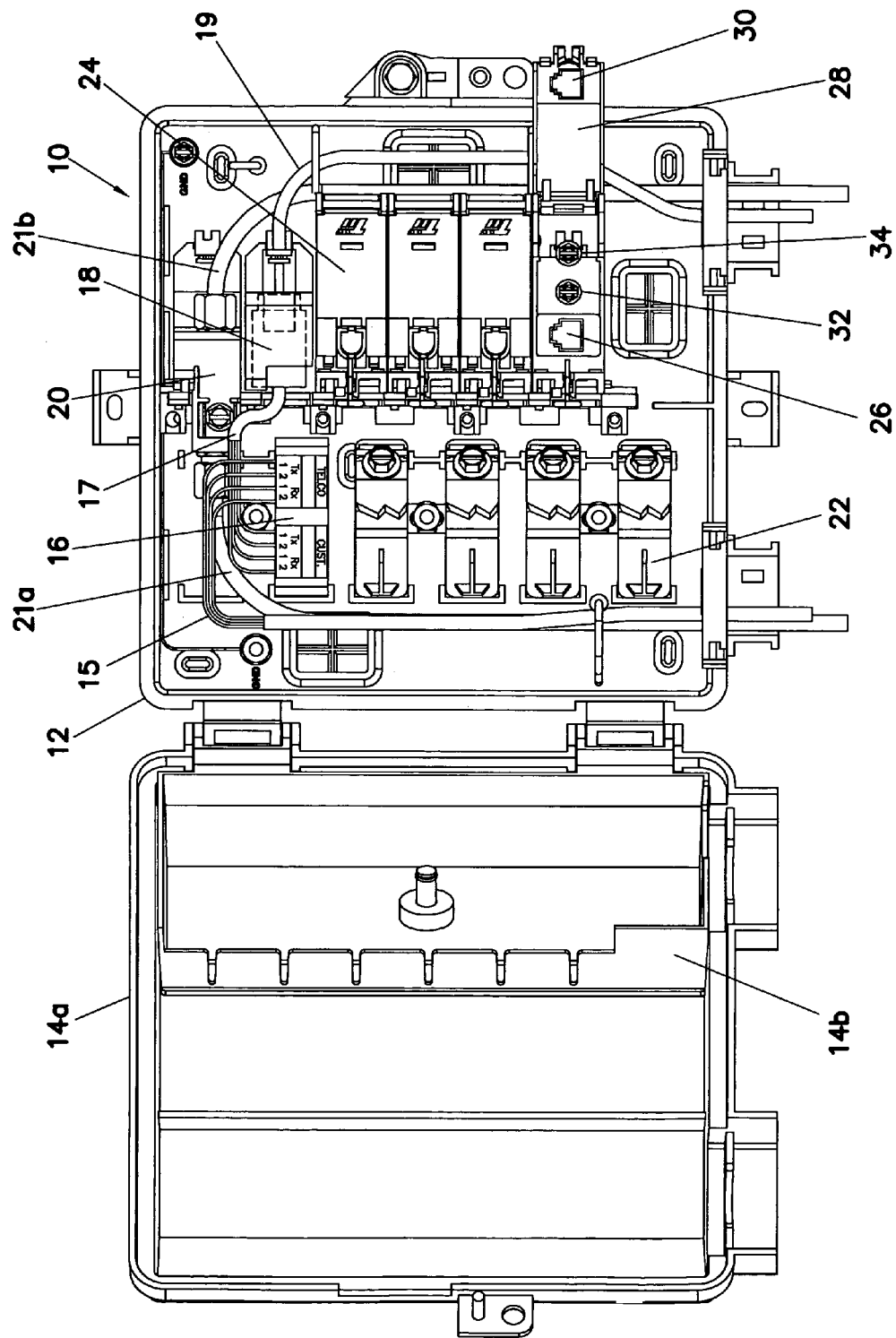
FIG. 1 is a top view of a network interface device according to the principles of the present invention.

FIG. 1 shows a network interface device 10 comprising an enclosure having a base 12, an outer cover 14a and an inner cover 14b. The inner cover 14b covers the left hand side of the base of the enclosure. Located in the enclosure are an overvoltage protection module 16 and an interconnection module 18 for connection in an Ethernet network. Overvoltage protection module 16 includes circuits, described in greater detail later, which provide overvoltage protection for the Ethernet network. Overvoltage protection module 16 is connected to an unshielded twisted pair cable 15 in an Ethernet network. An unshielded twisted pair cable 17 is connected between the overvoltage protection module 16 and the interconnection module 18. The interconnection module 18 is connected to an unshielded twisted pair cable 19 in an Ethernet network. Cable 15 is connected to a source of high speed digital signals, while cable 19 is connected to the destination of those signals. Cables 15, 17 and 19 may be Category 3, 4 or 5 cables but are preferably Category 5 cables.

Also located in the enclosure is a coaxial cable interconnection apparatus 20 which connects coaxial cables 21a 21b. As described later, coaxial cable interconnection apparatus 20 may include an in-line coaxial surge arrestor for providing overvoltage protection for the coaxial cable. In addition, the enclosure contains several station protector modules 22 and several subscriber bridge modules 24. The station protector modules provide overvoltage protection for telephone lines while the subscriber bridge modules interconnect the telephone company and subscriber lines. Suitable station protector modules are Model No. MSP350 sealed station protectors made by TII Industries, Inc., Copiague, N.Y. Inner cover 14b ensures that the station protector modules 22 are only accessible by telephone company personnel. The subscriber bridge modules 24 have hinged covers 28 which, when opened, reveal a telephone jack 26, which is preferably an RJ11 type jack. Cover 28 contains a protective material 30 which environmentally protects jack 26 when the cover is closed. The subscriber bridge modules 24 have terminals 32 and 34 for connecting the subscriber telephone wires. Jack 26 provides a point of demarcation between the telephone company and subscriber lines and is preferably a special switchable type of RJ11 jack as described in greater detail later.

Figure 2:
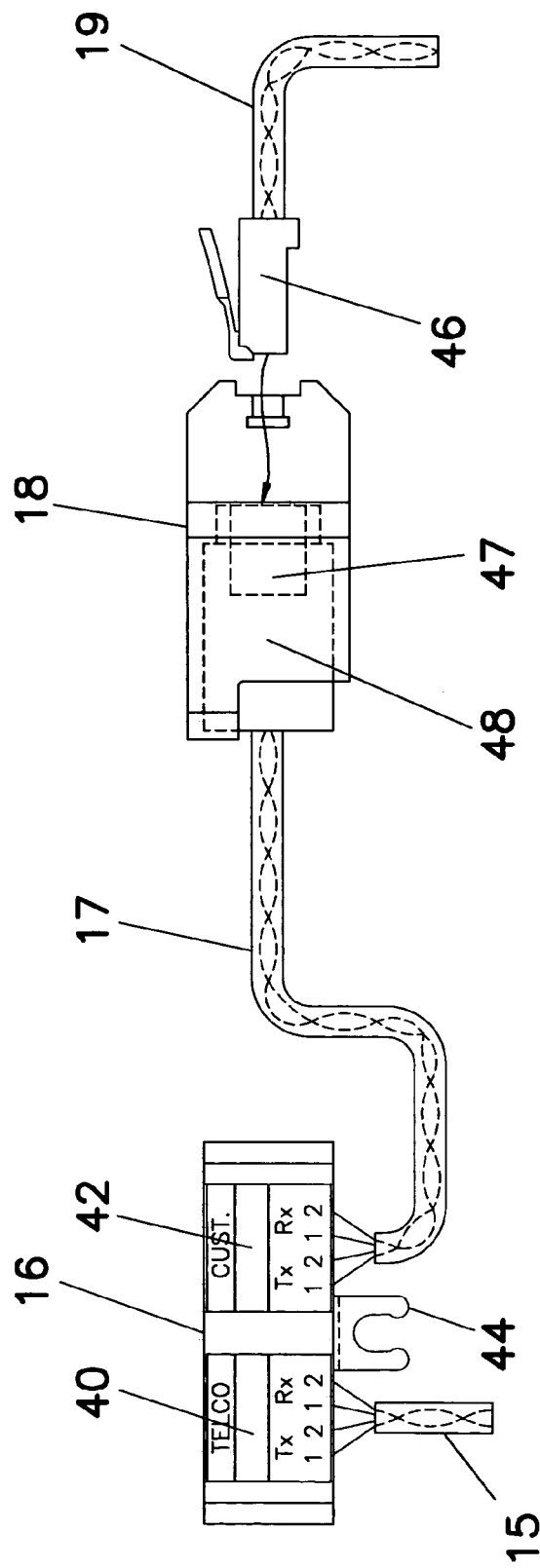
FIG. 2 is a top view of an overvoltage protection module and an interconnection module according to the principles of the present invention.

FIG. 2 shows an overvoltage protection module 16 and an interconnection module 18 in accordance with the present invention. The overvoltage protection module is connected to unshielded twisted pair cable 15 while the interconnection module 18 is connected to unshielded twisted pair cable 19. Unshielded twisted pair cable 17 connects overvoltage protection module 16 and interconnection module 18. Overvoltage protection module 16 has a ground lug 44 and two rocker arm wire termination devices 40 and 42 for terminating cables 15 and 17 respectively. The rocker arm wire termination devices employ insulation displacement contacts (IDCs) and are described in greater detail later. Each wire termination device terminates four wires. The interconnection module 18 comprises a bracket (described in greater detail later) and a cable ready connector 48 which may be a Stewart connector part number SS-800810SB-040-250 which is available from Stewart Connection Systems, R.D.2 Box 2020, Glen Rock, Pa. 17327. Connector 48 has an RJ45 jack 47 which mates with an RJ45 plug 46 on cable 19.

Figure 3C:
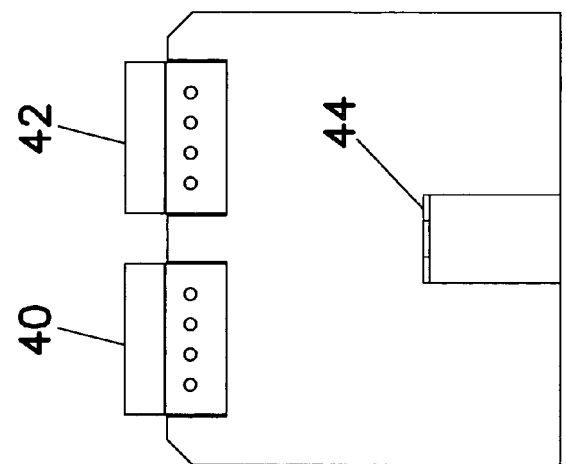
FIG. 3C is a side view of that module.
Figure 3B:
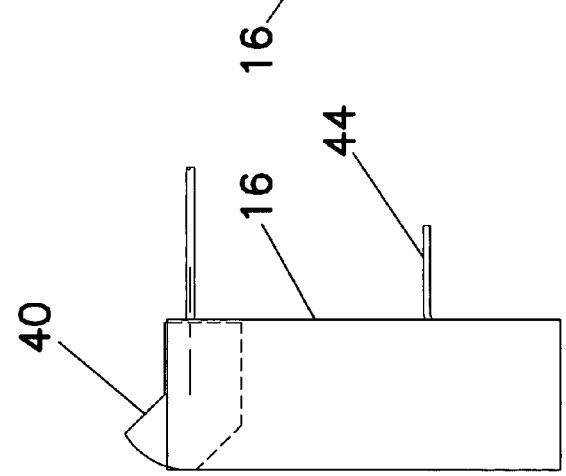
Figure 3A:
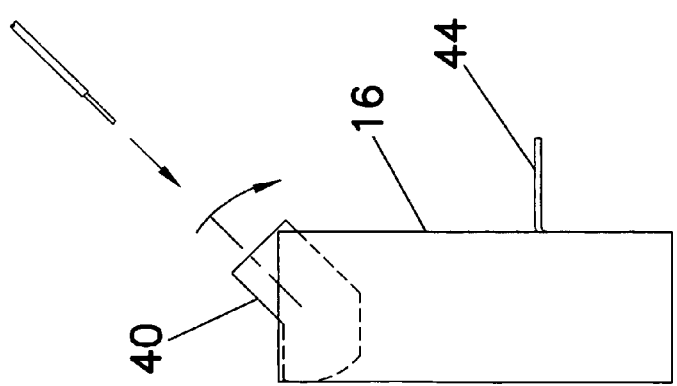

FIGS. 3A and 3B are end views and FIG. 3C is a side view of overvoltage protection module 16. These figures show the manner in which the rocker arms terminate wires. Thus, FIG. 3C shows rocker arm wire termination devices without any wires inserted and with the rocker arms in the open position. FIG. 3A shows a wire being inserted in rocker arm 40 while FIG. 3B shows rocker arm 40 in the closed position after the wire has been inserted.

Figure 4A:
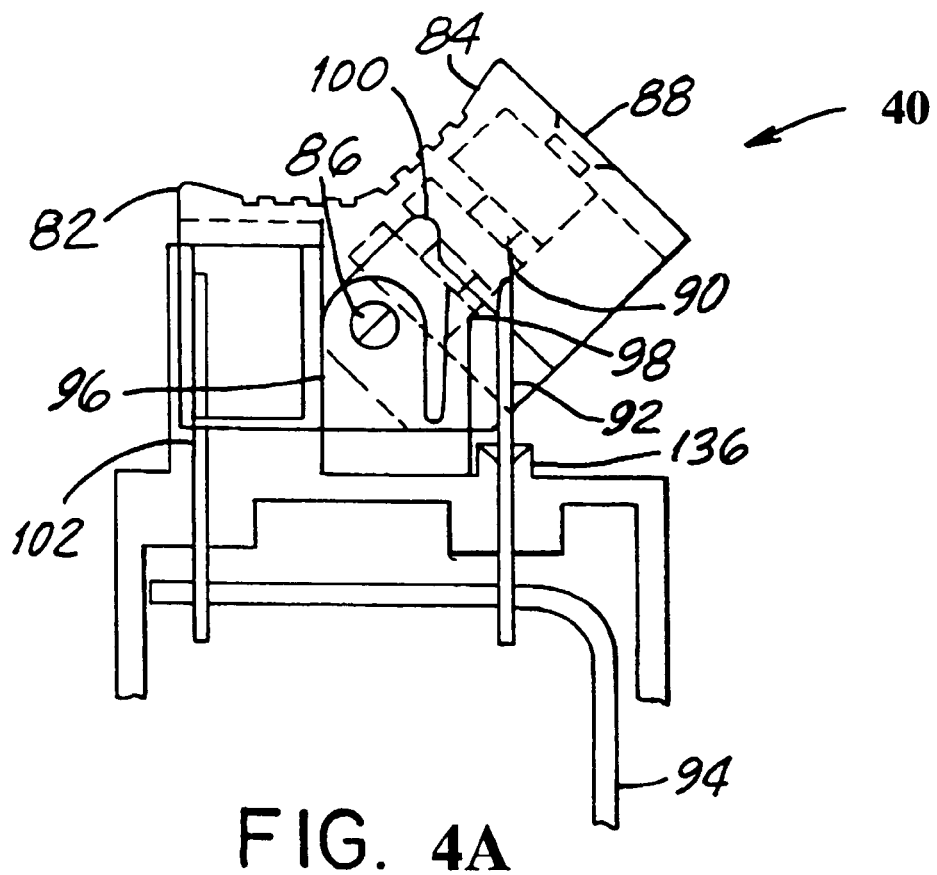
FIGS. 4A and 4B are cross-sectional views of a rocker arm wire termination mechanism for use in the network interface device of the present invention.
Figure 4B:
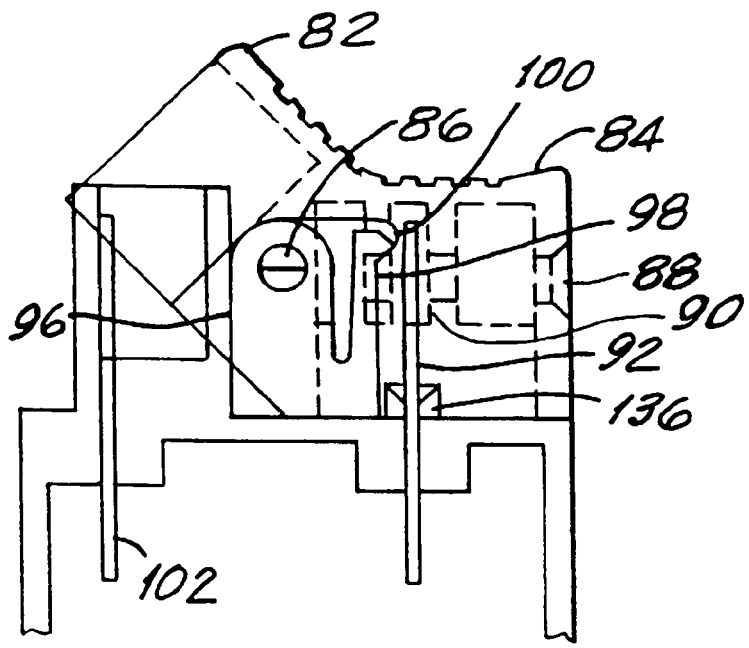

FIGS. 4A and 4B show sectional views of the rocker arm wire termination devices, FIG. 4A showing the rocker arm in the open position and FIG. 4B showing the rocker arm in the closed position. FIGS. 4A and 4B correspond to FIGS. 20 and 21 of the Meyerhoefer '136 patent. While rocker arms 40 and 42 are shown in FIG. 3C as each terminating four wires, rocker arms 40 could comprise two rocker arms, each for terminating two wires, as shown in FIG. 19 of the Meyerhoefer '136 patent, which is incorporated herein by reference.

As shown in FIGS. 4A and 4B, each rocker arm includes two legs 82 and 84 and a pivot 86 between the legs. Rocker arm wire termination device 40 is mounted to overvoltage protection module 16 at pivot 86. Leg 84 has multiple openings 88 and one or more cavities 90 which are generally perpendicular to and communicate with openings 88 which are adapted to receive insulated wires. Cavity 90 in leg 84 is adapted to receive an IDC contact 92 which is mounted on the overvoltage protection module which also has projections 96 for attaching the rocker arm at pivot point 86 such that when the rocker arm is pivoted about point 86 the cavity 90 in the rocker arm is forced down over IDC 92. Each IDC 92 has a slot which is adapted to receive an insulated wire. IDC 92 is connected to a conductor within the overvoltage protection module. Further details of the operation of the rocker arm wire termination devices can be found at column 8, lines 35 to 50 of the Meyerhoefer '136 patent which is incorporated herein by reference.

Figure 5:
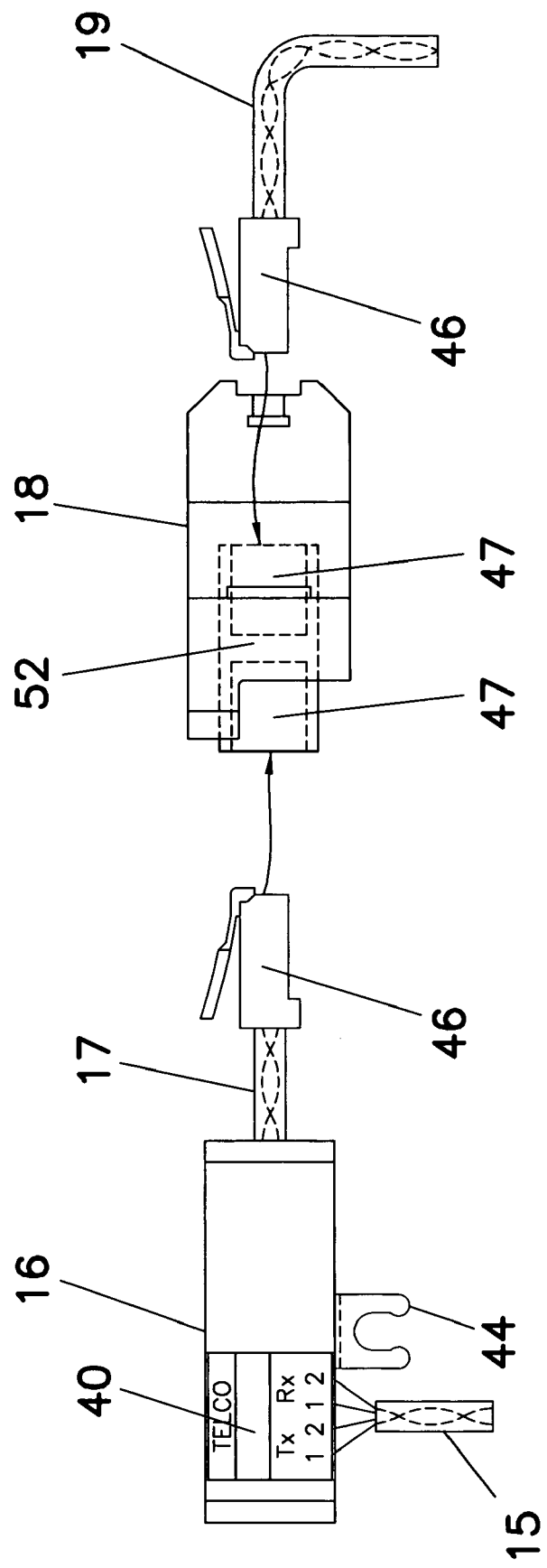
FIG. 5 is a top view of an overvoltage protection module and an interconnection module according to the principles of the present invention.

FIG. 5 shows another overvoltage protection module 16 and another interconnection module 18 in accordance with the present invention. Module 16 has a rocker arm wire termination device 40 and a cable 17 with an RJ45 plug 46 for connecting overvoltage protection module 16 to interconnection module 18. Interconnection module 18 comprises a bracket (described in greater detail later) in which is mounted a connector 52 which comprises back-to-back RJ45 jacks 47 which mate with RJ45 plugs 46 on cables 17 and 19. Connector 52 may be an RJ45 in-line connector available from AMP Incorporated, P.O. Box 3608, Harrisburg, Pa. 17105-3608 under part number 555052.

Figure 6:
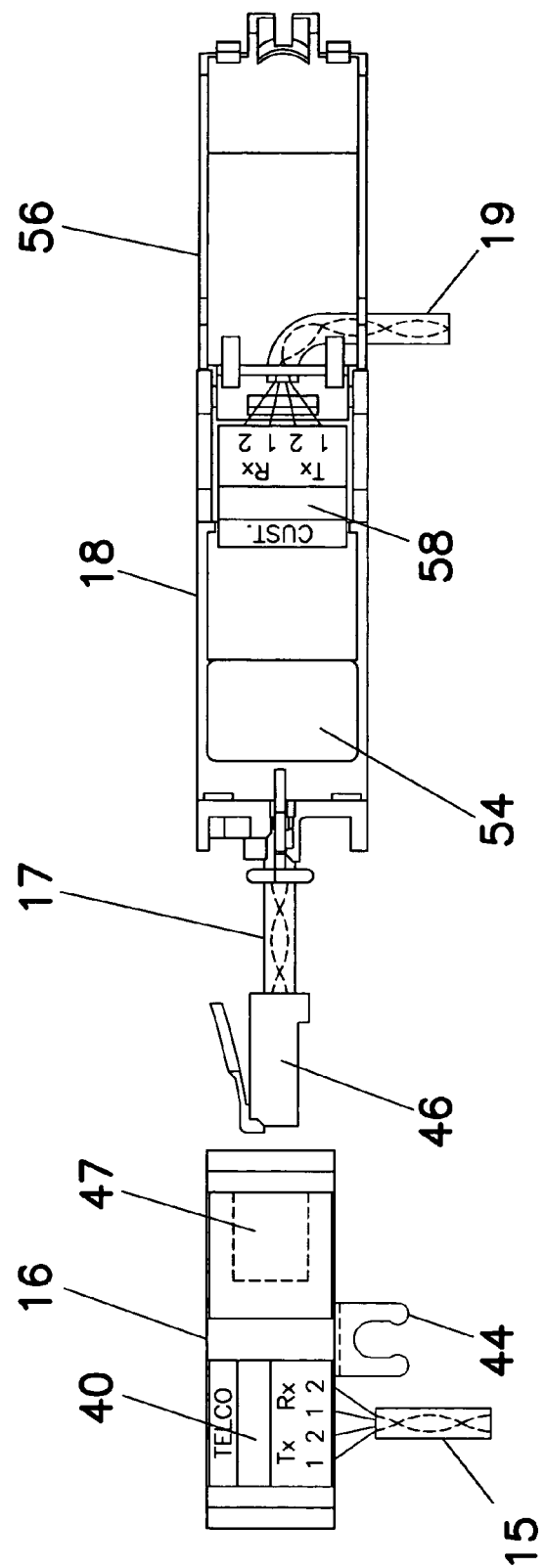
FIG. 6 is a top view of an overvoltage protection module and an interconnection module according to the principles of the present invention.

FIG. 6 shows another overvoltage protection module 16 and another interconnection module 18 in accordance with the present invention. Module 16 comprises a rocker arm wire termination device 40 and an RJ45 jack 47 for mating with RJ45 plug 46 on cable 17. Interconnection module 18 comprises a base 54, a cover 56 and a rocker arm wire termination device 58 for mating with unshielded twisted pair cable 19. Module 18 also has cable 17 with RJ45 plug 46.

Figure 7:
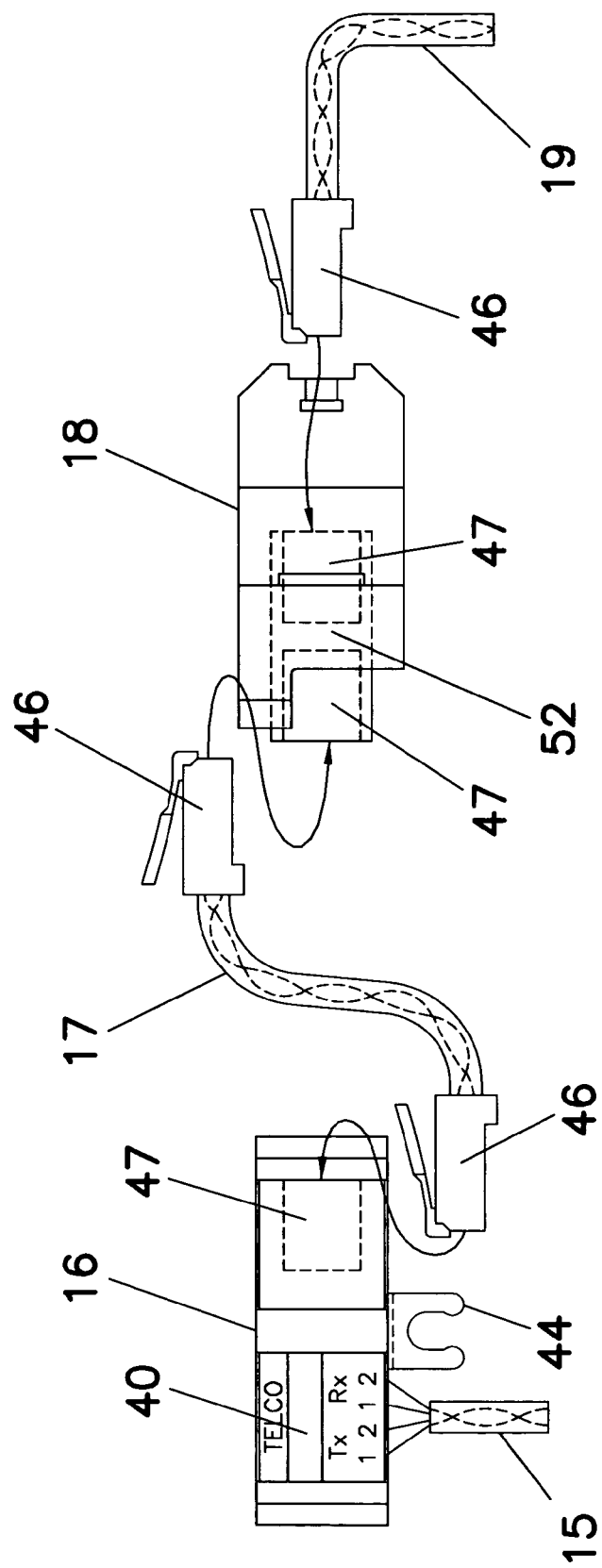
FIG. 7 is a top view of an overvoltage protection module and an interconnection module according to the principles of the present invention.

FIG. 7 shows another overvoltage protection module 16 and another interconnection module 18 in accordance with the present invention. Overvoltage protection module 16 in FIG. 7 is the same as module 16 in FIG. 6 while interconnection module 18 in FIG. 7 is the same as module 18 in FIG. 5. In FIG. 7 cable 17 has RJ45 plugs 46 at both ends for mating with the RJ45 jacks 47 in modules 16 and 18.

Figure 8:
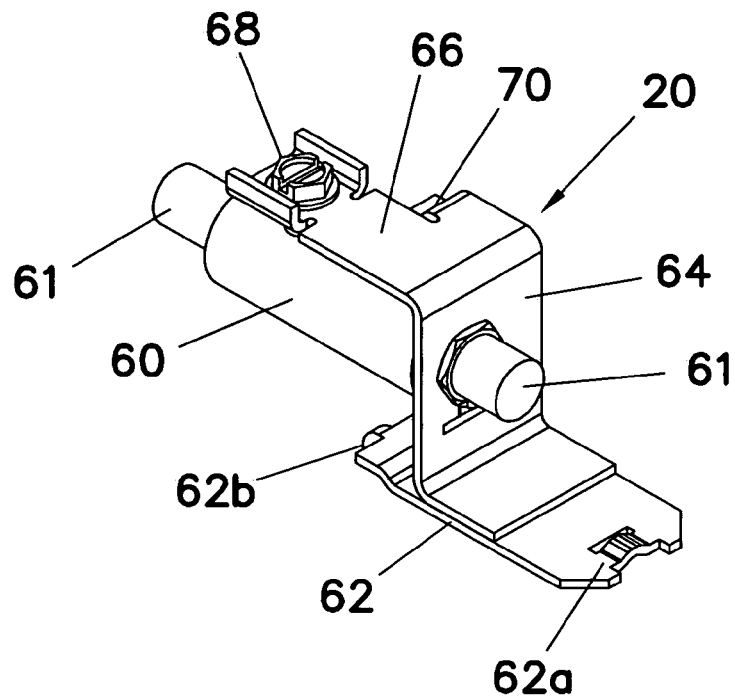
FIG. 8 is a perspective view of a coaxial cable interconnection apparatus for use in the network interface device of the present invention.

FIG. 8 shows a coaxial cable interconnection apparatus 20 having a coaxial surge arrestor 60 with female F-type coaxial connectors 61 on each end. The coaxial surge arrestor may, for example, be a Model No. 210FF75F22521 made by TII Industries, Inc., Copiague, N.Y. As shown in FIG. 8, apparatus 20 has a generally horizontal base portion 62, a generally vertical middle portion 64 and a generally horizontal top portion 66 having an electrical connection 68 which is adapted to be connected to ground by a wire (not shown). The middle portion 64 has an aperture in which coaxial surge arrestor 60 is mounted. The interconnection apparatus is preferably formed from two pieces of metal (a first generally flat member and a second Z-shaped member) which are spot welded together to form the structure shown in FIG. 8. This results in a structure that is simple, strong and inexpensive to manufacture.

Figure 10:
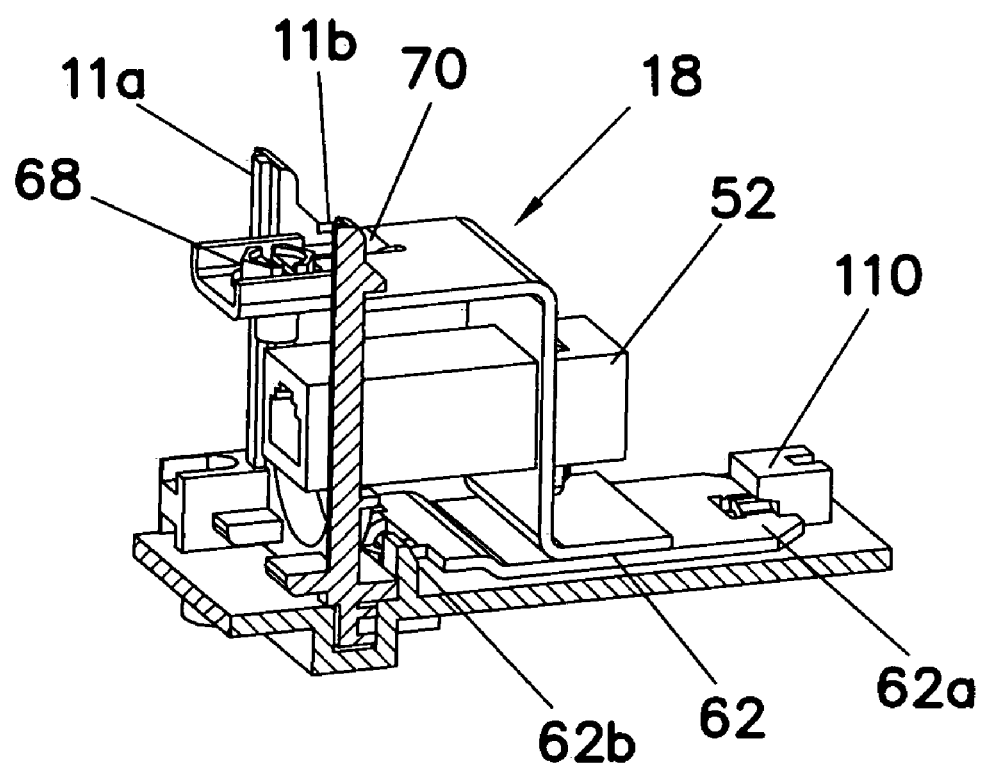
FIG. 10 is a perspective view, partially in section, of an interconnection module according to the principles of the present invention.
Figure 13:
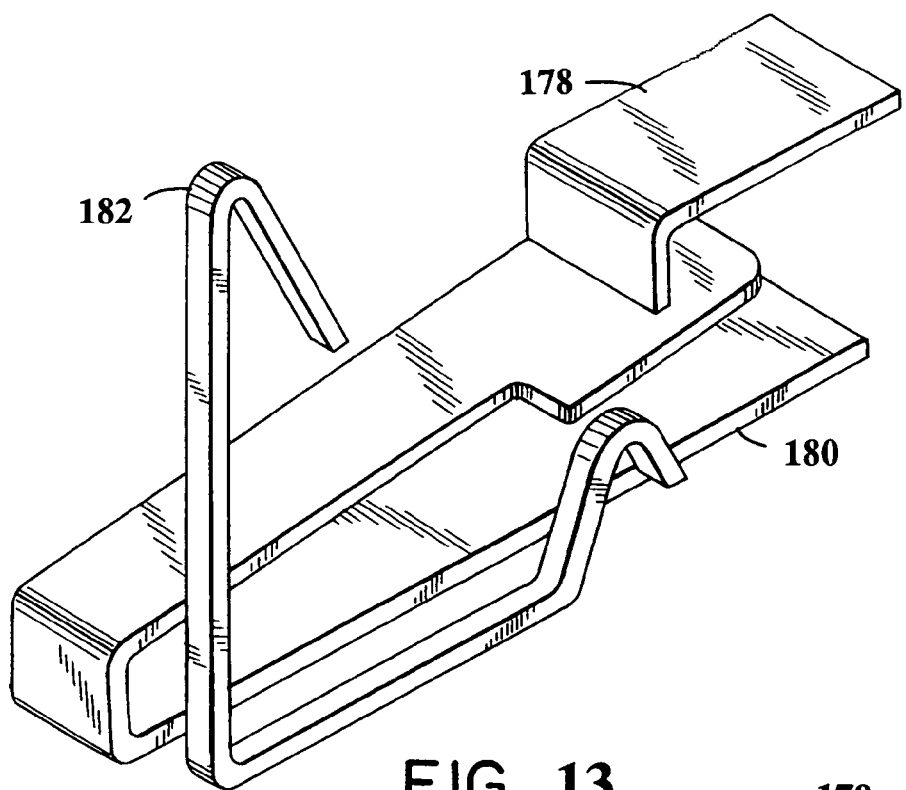
FIG. 13 is a perspective view of one set of electrical contacts for use in the switchable electrical socket shown schematically in FIG. 12, the contacts being shown in their normal position.
Figure 14:
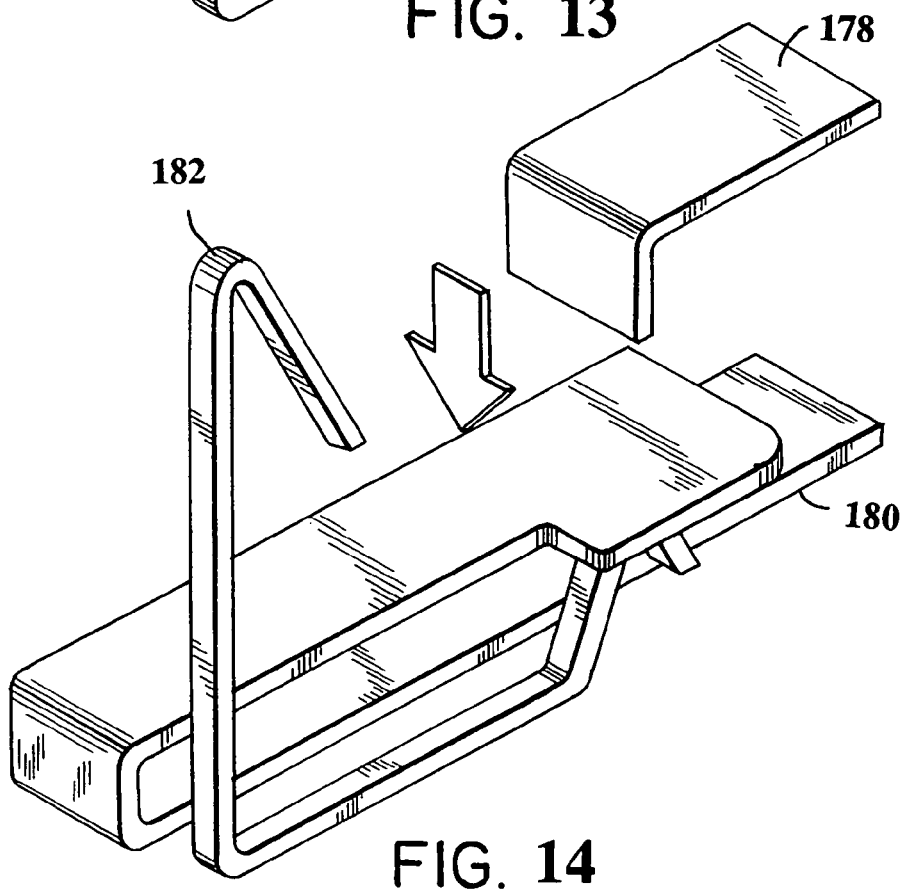
FIG. 14 is a perspective view of the same set of electrical contacts shown in FIG. 13 but the contacts being shown in their test position.

Coaxial cable interconnection apparatus 20 is adapted to be mounted interchangeably with subscriber bridge module 91 in FIG. 5 of the Schneider '466 patent. As noted at column 6, lines 61 et seq. of the Schneider '466 patent, module 91 is also described in FIGS. 13–17 of the Collins '209 patent. As shown in FIGS. 13 and 14 of the Collins '209 patent, the base of module 91 has a laterally projecting portion 114 at one end and a pair of downwardly projecting portions 115 at the other end. As shown in FIGS. 10 and 17 of that same patent, laterally projecting portion 114 fits under upwardly extending inverted L-shaped member 110 in the base of the enclosure, while downwardly projecting portions 115 fit into recess 112 in the base of the enclosure. See also column 6, line 44 through column 7, line 9 of the Collins '209 patent which describes how module 91 is inserted in and removed from the enclosure.

As shown in FIGS. 1–5 of the Schneider '466 patent, cable television module 220 has a laterally projecting portion 248 at the base which extends under upwardly extending inverted L-shaped members 110 in the base of the enclosure. (See FIGS. 1 and 4 and column 6, lines 34–43 of the Schneider '466 patent and FIG. 10 of the Collins '209 patent.) In addition, cable televison module 220 has a notch 264 (See FIG. 2 of the Schneider '466 patent) which receives a tab 11b which projects laterally from flexible member 11a which extends upwardly from the base of the enclosure (See FIGS. 1 and 5 and column 6, lines 34–50 of the Schneider '466 patent).

Coaxial cable interconnection apparatus 20 is adapted to be removably mounted in a network interface device using the following three structural features: (1) a laterally projecting portion at one end of the base of the apparatus which is adapted to fit under an upwardly projecting inverted L-shaped member in the base of the enclosure; (2) a downwardly projecting portion at the other end of the base of the apparatus which is adapted to fit into a recess in the base of the enclosure; and (3) a notch located on or near the top portion of the apparatus which is adapted to receive a tab which projects laterally from a flexible member which extends up from the base of the enclosure. These three structural features define an apparatus having a "Keptel footprint," Keptel, Inc. being the assignee of both the Collins '209 patent and the Schneider '466 patent.

Figure 9:
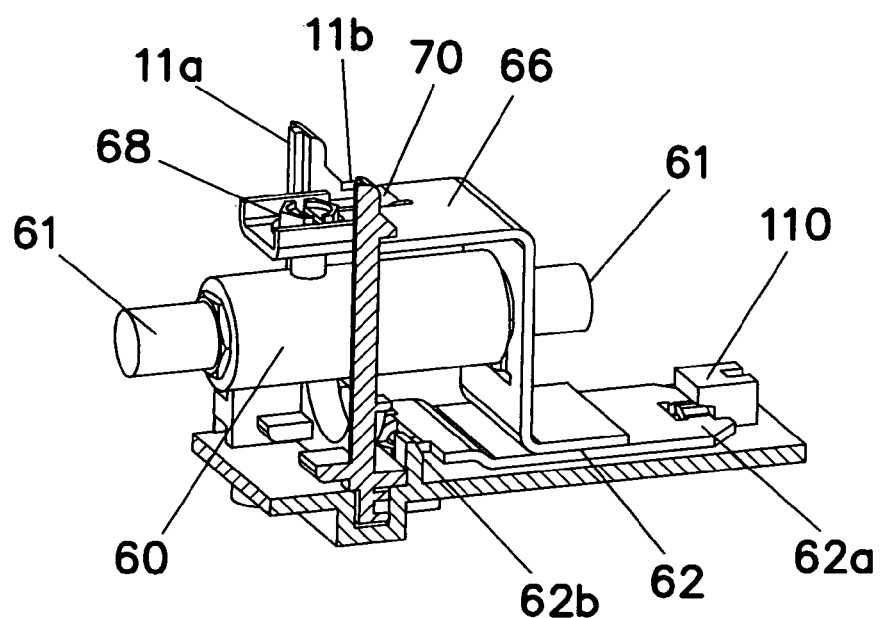
FIG. 9 is a perspective view, partially in section, of the coaxial cable interconnection apparatus of FIG. 8.

FIG. 9 illustrates how coaxial cable interconnection apparatus 20 is removably mounted in a network interface device. A laterally projecting portion 62a at one end of the base 62 slides under the inverted L-shaped member 110 which projects up from the base of the enclosure. As shown in FIG. 8, the end of portion 62a preferably has a shallow cutout which fits around L-shaped member 110 and helps restrain lateral movement of base 62 relative to member 110. As shown in FIG. 9, the other end of base 62 has a downwardly projecting portion 62b which fits into a recess in the base of the enclosure. The top portion 66 has a slot 70 which is adapted to receive tab 11b which extends laterally from flexible member 11a which projects upwardly from the base of the enclosure. Thus, the coaxial cable interconnection apparatus shown in FIGS. 8 and 9 has a "Keptel footprint".

FIG. 10 illustrates an interconnection module 18 which has an in-line connector 52 comprising back-to-back RJ45 jacks. As shown in FIG. 10, interconnection module 18 also has a "Keptel footprint" and is removably mounted in the network interface device the same way as the coaxial cable interconnection apparatus of FIGS. 8 and 9.

Figure 11:
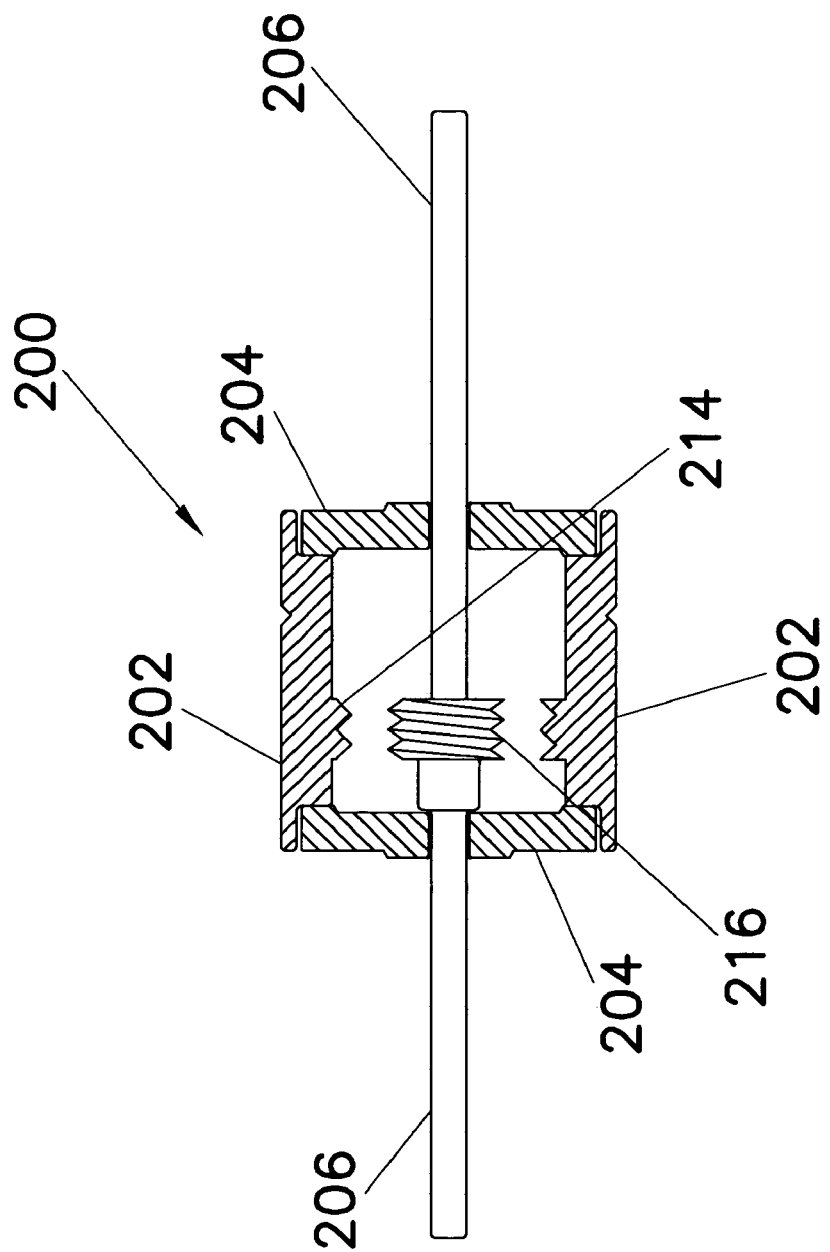
FIG. 11 is a cross-sectional view of a coaxial surge arrestor for use with the coaxial cable interconnection apparatus of FIGS. 8 and 9.

FIG. 11 is a reproduction of FIG. 14 from the Chaudhry '056 patent and illustrates a coaxial surge arrestor 200 which may be used in the coaxial cable interconnection apparatus of FIGS. 8 and 9. As explained at column 6, line 54 through column 7, line 51 of the Chaudhry '056 patent, a portion of the interior surface 214 of conductive housing 202 and a portion of the exterior surface 216 of center conductor 206 are roughened, for example by threads or other forms of serration, to concentrate the electric field and increase the reliability of the gas discharge tube operation. In addition, as with conventional gas discharge tubes, the surfaces 214 and 216 are preferably coated with a low work function material to reduce the breakdown voltage and enhance the firing characteristics of the gas discharge tube. The gas discharge occurs between surfaces 214 and 216, which is the active discharge region.

As also shown in FIG. 11, the distance between the inner surface of the conductive housing 202 and the outer surface of the center conductor 206 varies along the length of the center conductor. Put another way, the ratio of the inside diameter D of housing 202 to the outside diameter d of center conductor 206 varies along the length of the center conductor. The ratio D/d may vary by a factor of 2 or 3 or more along the length of center conductor 206. This variation in the ratio D/d is used to adjust the impedance of the gas discharge tube and for matching the impedance of the surge arrestor in which the gas discharge tube is located to that of the coaxial transmission line to which the surge arrestor is attached.

The impedance of a coaxial transmission line is proportional to the logarithm of (D/K)/d, where "D" is the inside diameter of the outer conductor, "d" is the outside diameter of the inner conductor and "K" is the dielectric constant of the medium between the inner and outer conductors. In the case of the gas discharge tube shown in FIG. 11, the medium is an inert gas which has a dielectric constant of approximately one. Therefore, the impedance of the gas discharge tube varies between the insulating ends as the logarithm of the ratio D/d. As noted earlier, the insulating ends 204 are preferably ceramic and ceramic has a dielectric constant of about eight. By varying the ratio D/d along the length of center conductor 206 one can compensate for changes in impedance caused by, inter alia, the dielectric constants of the insulating ends 204.

Additional details concerning the structure and operation of coaxial surge arrestor 200 can be found at column 6, lines 54 through column 7, line 50 of the Chaudhry '056 patent which is incorporated herein by reference.

Figure 12:
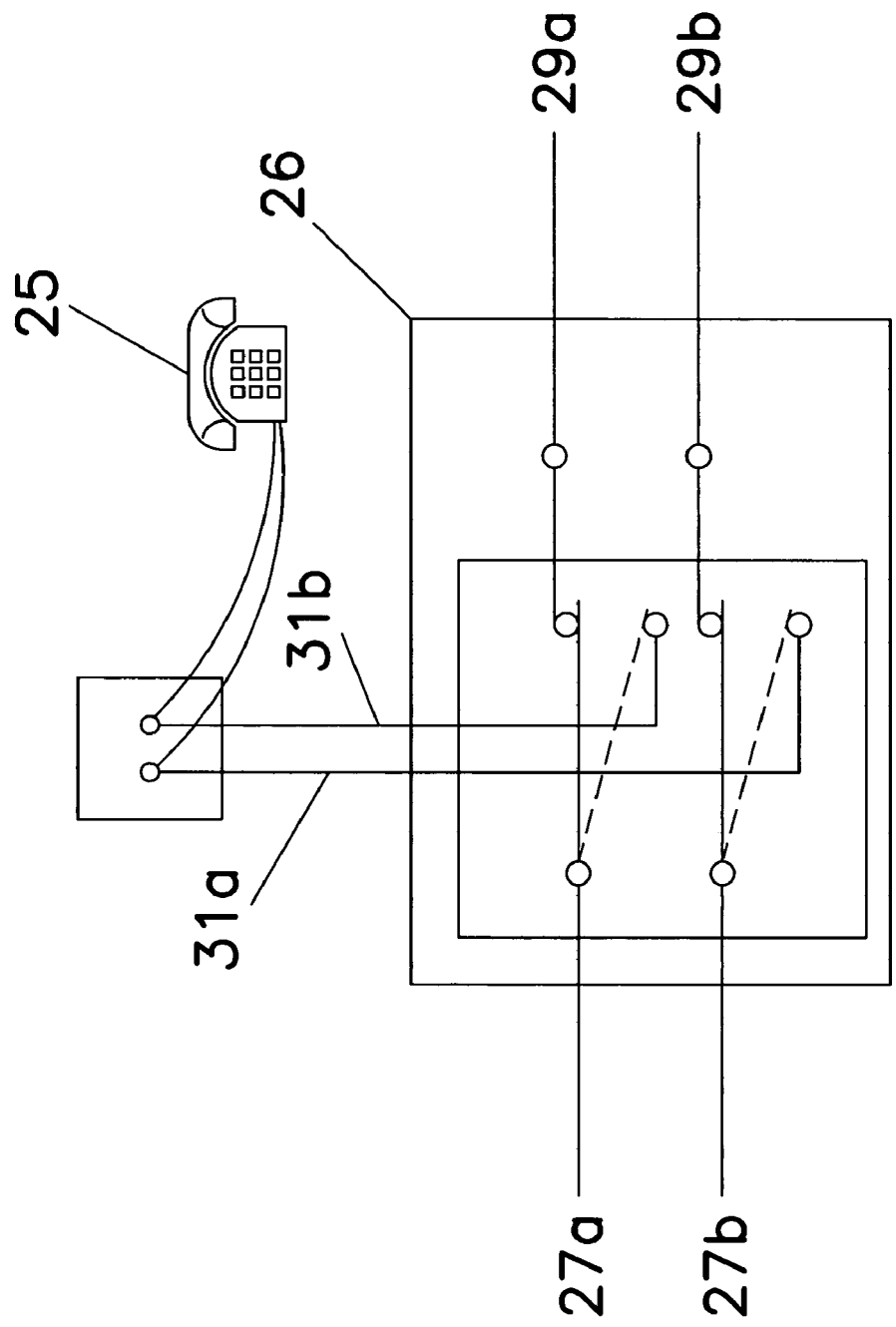
FIG. 12 is a schematic diagram of a switchable electrical socket for use in a subscriber bridge module in the network interface device of the present invention.

As shown schematically in FIG. 12, the removable subscriber bridge module 24 preferably contains a plug-actuated switchable RJ11 type socket 26 that may be connected to a test phone 25. Under normal operation (with no plug in the socket) the telephone company wires 27a, 27b are connected to the subscriber wires 29a, 29b. When a plug is inserted in the socket, the telephone company wires are disconnected from the subscriber wires and are connected to wires 31a, 31b which are then connected to test phone 25. This arrangement provides a point of demarcation between the telephone company and subscriber lines.

FIGS. 13 and 14 are reproduced from FIGS. 17 and 18 of the Meyerhoefer '136 patent. As shown in FIGS. 13 and 14, the plug actuated switchable socket 26 has a subscriber contact 178 for connection to the subscriber wires, a telephone company contact 180 for connection to the telephone wires and a test contact 182 for connection to a plug. Test contact 182 does not lie in the same plane as the subscriber and telephone company contacts 178 and 180. Note that subscriber contact 178 and telephone company contact 180 are of a heavier gauge material (and therefore have a greater current carrying capacity) than test contact 182. This increases the reliability of the switchable socket as a mechanism for connecting the telephone company and subscriber lines.

FIGS. 13 and 14 also show the interaction of the subscriber, telephone company and test contacts. As would be understood by a person of ordinary skill in the art, while FIGS. 13 and 14 only show one set of subscriber, telephone company and test contacts, switchable socket 26 actually has two sets of such contacts to accommodate the pair of telephone company and subscriber wires.

Figure 15:
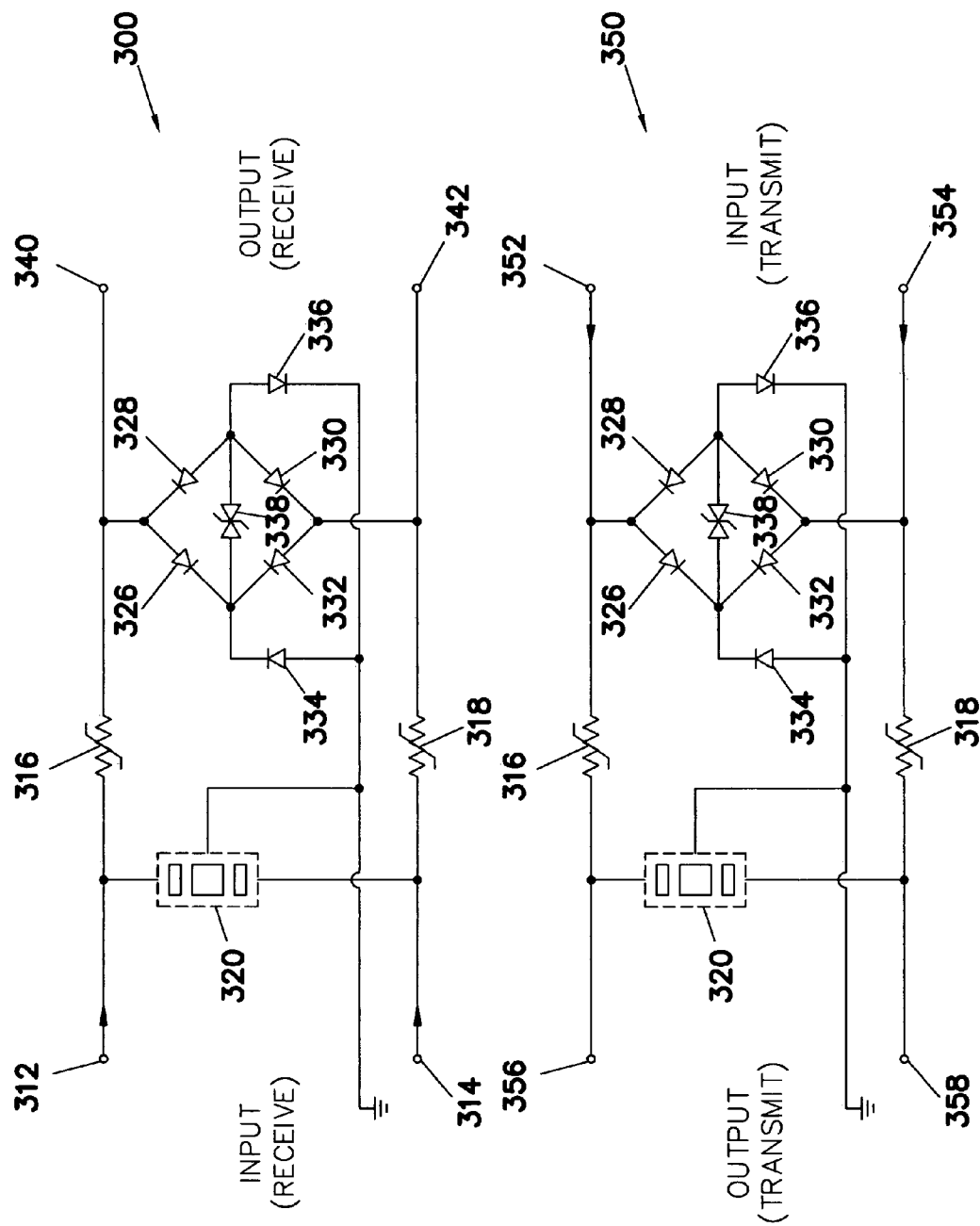
FIG. 15A is a schematic diagram of a first overvoltage/overcurrent protection circuit for use in the overvoltage protection module of the present invention.
FIG. 15B is a schematic diagram of a second overvoltage/overcurrent protection circuit for use in the overvoltage protection module of the present invention.
Figure 16:
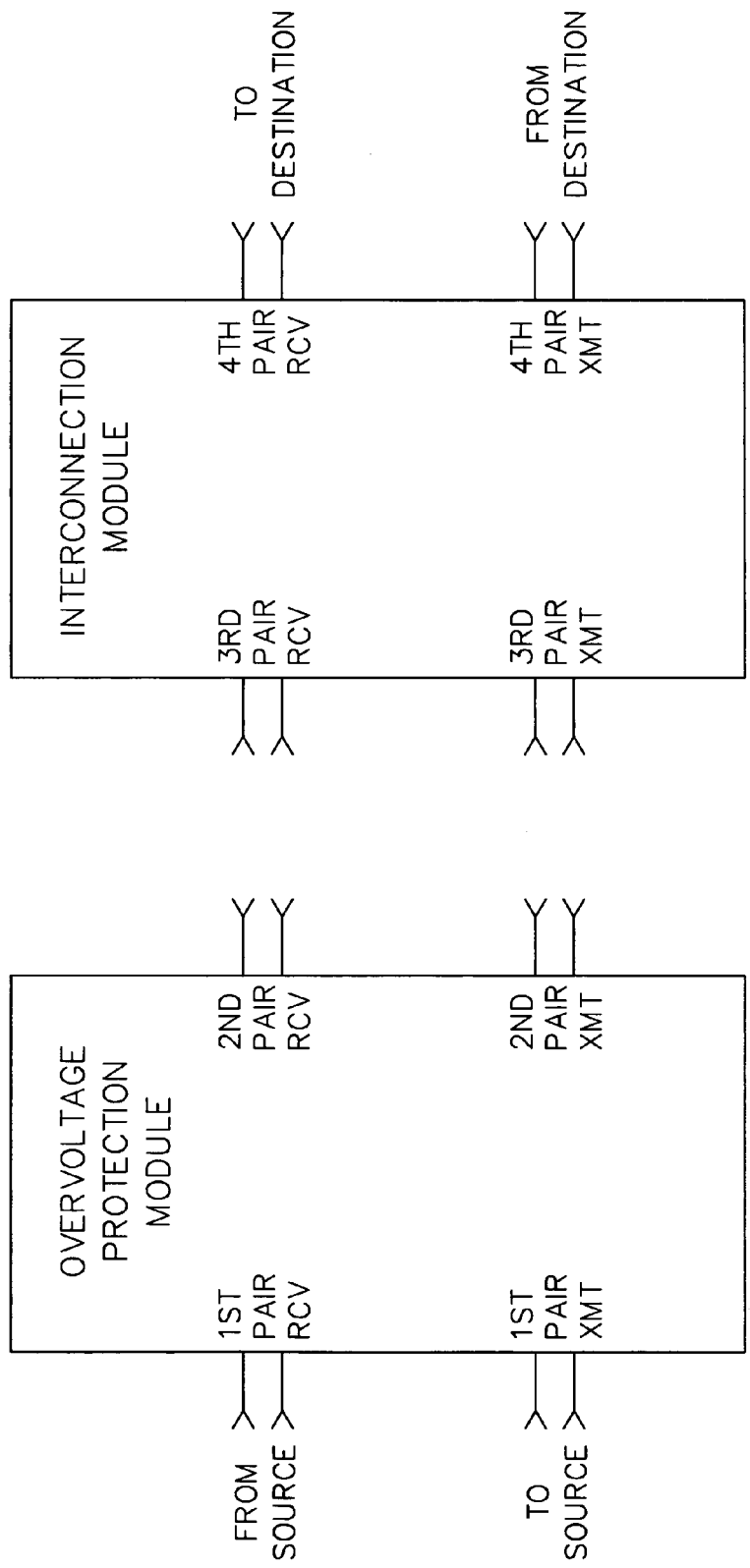
FIG. 16 is a schematic diagram illustrating the terminology employed in the patent claims.

When the plug is not plugged into switchable socket 26, the telephone company contact 180, and thus the telephone company wires, are connected to the subscriber contact 178, and thus the subscriber wires, and the test contact 182 is out of the circuit. When the plug is inserted in socket 26, the subscriber contact 178, and thus the subscriber wires are disconnected from the telephone company contact 180, and thus the telephone company wires, and the telephone company contact and telephone company wires are connected to the test contact 182 in socket 26 which mate with contacts in the RJ11 test plug. See also FIGS. 14–16 of the Meyerhoefer '136 patent which show the mechanical interaction between the test plug and the switchable socket. FIGS. 14–16 are incorporated herein by reference.

FIG. 15A is a schematic diagram of an overvoltage/overcurrent protection circuit 300 which is adapted to be connected in series with unshielded twisted pair of wires carrying incoming digital signals in an Ethernet network. Circuit 300 is located within overvoltage protection module 16 and has an input (receive) side and an output (receive) side. The input side is adapted to be connected to a source of digital signals at terminals 312 and 314. The source may, for example, be the output from an optical network unit (ONU), a concentrator, a computer, a local area network (LAN) or a wide area network (WAN). The output side of circuit 300 is adapted to be connected to a destination of digital signals at terminals 340 and 342. The destination may, for example, be a computer or a LAN and one or more servers and one or more personal computers (PCs) may be connected to the LAN.

Circuit 300 provides both primary and secondary overvoltage protection as well as overcurrent protection. The overcurrent protection is provided by positive temperature coefficient resistors (PTCRs) 316 and 318 which are connected in series with the unshielded twisted pair of wires carrying the incoming digital signals. PTCRs may be type TR600-15 which are available from Raychem Corp., Menlo Park, Calif. The primary overvoltage protection section comprises three-electrode gas discharge tube 320 which is connected across the twisted pair of wires which carry the incoming digital signals. Gas discharge tube 320 conducts when the voltage on either of the twisted wires exceeds a threshold value. The breakdown voltage may be between about 150 and about 300 volts, with a breakdown voltage of on the order of 250 volts being preferred. A suitable three-electrode gas discharge tube is shown in Napiorkowski, U.S. Pat. No. 4,212,047. Suitable three-electrode gas discharge tubes are also available from TII Industries, Inc., Copiague, N.Y. as TII 71 type or 73/75 type with a voltage breakdown range of 150–300 VDC.

As will be understood by persons skilled in the art, two two-electrode gas discharge tubes may be used in lieu of a single three electrode gas discharge tube and using two two-electrode gas discharge tubes is the full equivalent of using one three-electrode gas discharge tube. In the present invention three-electrode gas discharge tubes are preferred to two-electrode gas discharge tubes and, therefore, three-electrode gas discharge tubes are shown in FIGS. 15A and 15B.

The secondary overvoltage protection section of circuit 300 comprises diodes 326 through 336 and avalanche diode 338. Diodes 326 through 332 form a diode bridge and avalanche diode 338 is connected across the diode bridge. The diode bridge is connected across the twisted pair of wires carrying the incoming digital signals and limits the voltage on those wires in the event that the voltage substantially exceeds, for example, the normal digital signal levels. Typical digital signal levels are plus or minus five volts. Diodes 326 through 332 may be type IN4007, 1 amp, 1000 volt PIV diodes. Diodes 334 and 336 may be type RL204G, 2 amp, 1000 volt PIV diodes. Diode 338 may be a type 1.5KE12, 12 volt avalanche diode. Alternatively, diode 338 may be two series-connected low capacitance, 6 volt 1500 watt diodes made by Samtech of 650 Mitchell Road, Newbury Park, Calif. 91320 and sold under part number LC01-6.

Using two avalanche diodes connected in series provides two benefits: (1) the surge energy handling capability of the protector doubles and (2) the capacitance offered to the diode bridge is halved. Two avalanche diodes connected in parallel could also double the surge handling capability, but diodes do not have the same breakdown voltage, and therefore do not share energy equally. Moreover, using two avalanche diodes connected in parallel causes the capacitance to the diode bridge to double, which could significantly attenuate the digital signal.

Excessive positive voltages appearing at terminal 340 are clamped by diodes 326 and 336 and avalanche diode 338. Excessive negative voltages appearing at terminal 340 are clamped by diodes 328 and 334 and avalanche diode 338. Excessive positive voltages appearing on terminal 342 are clamped by diodes 332 and 336 and avalanche diode 338. Excessive negative voltages appearing at terminal 342 are clamped by diodes 330 and 334 and avalanche diode 338. If diode 338 is a 12 volt avalanche diode, then voltages exceeding about plus or minus 15 volts would be clamped by the secondary protection circuit. If diode 338 is two series-connected 12 volt avalanche diodes, then voltages exceeding about 35 volts would be clamped by the secondary protection circuit. Avalanche diodes are available with many different breakdown voltages and the clamping voltage may be chosen by selecting suitable avalanche diodes.

FIG. 15B is a schematic diagram of an overvoltage/overcurrent protection circuit 350 which is located within overvoltage protection module 16. Circuit 350 is the same as circuit 300 and operates the same way. Terminals 352 and 354 of circuit 350 are connected to the unshielded twisted pair of wires carrying high speed digital signals from the destination back to the source, while terminals 356 and 358 are connected to the unshielded twisted pair of wires that are connected to the source.

FIG. 16 is a schematic diagram which illustrates the terminology employed in the patent claims. Thus, FIG. 16 shows that the overvoltage protection module has first and second pairs of receive electrical connections and first and second pairs of transmit electrical connections whereas the interconnection module has third and fourth pairs of receive electrical connections and third and fourth pairs of transmit electrical connections.

The second and third pairs of receive electrical connections are connected by cabling (not shown in FIG. 16 but shown in earlier figures) and the second and third pairs of transmit electrical connections are connected by cabling (not shown in FIG. 16 but shown in earlier figures). The first pair of receive electrical connections receive signals from the source while the first pair of transmit electrical connections transmit signals back to the source. The fourth pair of receive electrical connections forward signals to the destination while the fourth pair of transmit electrical connections forward signals from the destination.

It will be understood that various changes in the details, materials, arrangement of parts and operating conditions which have been herein described and illustrated in order to explain the nature of the invention may be made by those skilled in the art without departing from the principles and scope of the instant invention.

What is claimed is:

1. Network interference apparatus for connecting a source and a destination in an Ethernet network using unshielded twisted pair cables, the apparatus comprising:
   (a) an overvoltage protection module for connecting the apparatus to the source and for providing overvoltage protection for the unshielded twisted pairs of wires, the overvoltage protection module comprising:
      (1) first and second pairs of receive electrical connections and a first overvoltage protection circuit connected in series between the first and second pairs of receive connections, the first pair of receive connections for being connected to a first unshielded twisted pair of wires carrying high speed digital signals from the source and the second pair of receive connections for being connected to an interconnection module,
      (2) first and second pairs of transmit electrical connections and a second overvoltage protection circuit connected in series between the first and second pairs of transmit connections, the first pair of transmit connections for being connected to a second unshielded twisted pair of wires for carrying high speed digital signals to the source and the second pair of transmit connections for being connected to the interconnection module; and
   (b) an interconnection module for connecting the apparatus to the destination, the interconnection module comprising
      (1) third and fourth pairs of receive electrical connections, the third pair of receive connections for being connected to the second pair of receive connections on the overvoltage protection module and the fourth pair of receive connections for being connected to a third unshielded twisted pair of wires for carrying high speed digital signals to the destination, and
      (2) third and fourth pairs of transmit electrical connections, the third pair of transmit connections for being connected to the second pair of transmit connections on the overvoltage protection module and the fourth pair of transmit connections for being connected to a fourth unshielded twisted pair of wires carrying high speed digital signals from the destination.

2. The apparatus of claim 1 wherein at least one pair of receive electrical connections and at least one pair of transmit electrical connections comprise insulation displacement contacts.

3. The apparatus of claim 1 wherein at least one pair of receive electrical connections and at least one pair of transmit electrical connections comprise contacts in an RJ45 plug.

4. The apparatus of claim 1 wherein at least one pair of receive electrical connections and at least one pair of transmit electrical connections comprise contacts in an RJ45 jack.

5. The apparatus of claim 1 wherein at least two pair of receive electrical connections and at least two pair of transmit electrical connections comprise insulation displacement contacts.

6. The apparatus of claim 1 wherein at least one pair of receive electrical connections and at least one pair of transmit electrical connections comprise contacts in an RJ45 plug and at least one pair of receive electrical connections and at least one pair of transmit electrical connections comprise contacts in an RJ45 jack.

7. The apparatus of claim 1 wherein at least one pair of receive electrical connections and at least one pair of transmit electrical connections comprise insulation displacement contacts and wherein at least one pair of receive electrical connections and at least one pair of transmit electrical connections comprise contacts in an RJ45 plug.

8. The apparatus of claim 1 wherein at least one pair of receive electrical connections and at least one pair of transmit electrical connections comprise insulation displacement contacts and wherein at least one pair of receive electrical connections and at least one pair of transmit electrical connections comprise contacts in an RJ45 socket.

9. The apparatus of any of claims 1 through 8 wherein both the first overvoltage protection circuit and the second overvoltage protection circuit comprises a gas discharge tube and a diode bridge with an avalanche diode connected across the diode bridge.

10. The apparatus of claim 9 wherein each overvoltage protection circuit includes a pair of positive temperature coefficient resistors (PTCRs) for providing overcurrent protection, the first pair of PTCRs being connected in series between the first and second pairs of receive electrical connections and the second pair of PTCRs being connected in series between the first and second pair of transmit electrical connections.

11. The apparatus of any of claim 1, 4, 5 or 8 wherein the interconnection module comprises a cable ready RJ45 jack.

12. The apparatus of any of claim 1, 2, 3, 4, 6, 7 or 8 wherein the interconnection module comprises back-to-back RJ45 jacks.

13. The apparatus of any of claims 1 through 8 wherein the interconnection module comprises a customer bridge module wherein at least one pair of receive electrical connections and at least one pair of transmit electrical connections comprise insulation displacement contacts and wherein at least one pair of receive electrical connections and at least one pair of transmit electrical connections comprise contacts in an RJ45 plug.

14. The apparatus of any of claim 1, 2 or 5 wherein all of the receive electrical connections and all of the transmit electrical connections on the overvoltage protection module comprise insulation displacement contacts.

15. The apparatus of any of claim 1, 2, 3 or 7 wherein half of the receive electrical connections and half of the transmit electrical connections on the overvoltage protection module comprise insulation displacement contacts and half of the receive electrical connections and half of the transmit electrical connections on the overvoltage protection module comprise contacts in an RJ45 plug.

16. The apparatus of any of claim 1, 2, 4 or 8 wherein half of the receive electrical connections and half of the transmit electrical connections on the overvoltage protection module comprise insulation displacement contacts and half of the receive electrical connections and half of the transmit electrical connections on the overvoltage protection module comprise contacts in an RJ45 socket.

17. The apparatus of any of claims 1 through 4 and 6 through 8 wherein the interconnection module comprises a metallic structure having a generally horizontal base portion, a generally vertical middle portion with an aperture therein for receiving an electrical connector and a generally horizontal top portion, the structure having a Keptel footprint.

18. The apparatus of any of claims 1 through 8 wherein the overvoltage protection module comprises a rocker arm type wire termination device comprising:
(a) a rocker arm with a pivot for mounting the rocker arm to the overvoltage protection module,
(b) first and second openings in the rocker arm adapted to receive first and second insulated wires, respectively; and
(c) first and second cavities in the rocker arm adapted to receive first and second insulation displacement contacts when the rocker arm is rotated about its pivot point to force the first and second wires into engagement with the first and second insulation displacement contacts.

19. The apparatus of claim 18 wherein the wire termination device further comprises:
(a) third and fourth openings in the rocker arm adapted to receive third and fourth insulated wires, respectively; and
(b) third and fourth cavities in the rocker arm adapted to receive third and fourth insulation displacement contacts when the rocker arm is rotated about its pivot point to force the third and fourth wires into the engagement with the third and fourth insulation displacement contacts.

20. Network interface apparatus for connecting a source and a destination in an Ethernet network using unshielded twisted pair cables, the apparatus comprising:

(a) an enclosure having a base and at least one cover;
(b) an overvoltage protection module mounted in the enclosure for connecting the apparatus to the source and for providing overvoltage protection for the unshielded twisted pairs of wires, the overvoltage protection module comprising:
  (1) first and second pairs of receive electrical connections and a first overvoltage protection circuit connected in series between the first and second pairs of receive connections, the first pair of receive connections for being connected to a first unshielded twisted pair of wires carrying high speed digital signals from the source and the second pair of receive connections for being connected to an interconnection module,
  (2) first and second pairs of transmit electrical connections and a second overvoltage protection circuit connected in series between the first and second pairs of transmit connections, the first pair of transmit connections for being connected to a second unshielded twisted pair of wires for carrying high speed digital signals to the source and the second pair of transmit connections for being connected to the interconnection module; and
(c) an interconnection module mounted in the enclosure for connecting the apparatus to the destination, the interconnection module comprising
  (1) third and fourth pairs of receive electrical connections, the third pair of receive connections for being connected to the second pair of receive connections on the overvoltage protection module and the fourth pair of receive connections for being connected to a third unshielded twisted pair of wires for carrying high speed digital signals to the destination, and
  (2) third and fourth pairs of transmit electrical connections, the third pair of transmit connections for being connected to the second pair of transmit connections on the overvoltage protection module and the fourth pair of transmit connections for being connected to a fourth unshielded twisted pair of wires carrying high speed digital signals from the destination.

21. The apparatus of claim 20 wherein at least one pair of receive electrical connections and at least one pair of transmit electrical connections comprise insulation displacement contacts.

22. The apparatus of claim 20 wherein at least one pair of receive electrical connections and at least one pair of transmit electrical connections comprise contacts in an RJ45 plug.

23. The apparatus of claim 20 wherein at least one pair of receive electrical connections and at least one pair of transmit electrical connections comprise contacts in an RJ45 jack.

24. The apparatus of claim 20 wherein both the first overvoltage protection circuit and the second overvoltage protection circuit comprises a gas discharge tube and a diode bridge with an avalanche diode connected across the diode bridge.

25. The apparatus of claim 24 wherein each overvoltage protection circuit includes a pair of positive temperature coefficient resistors (PTCRs) for providing overcurrent protection, the first pair of PTCRs being connected in series between the first and second pairs of receive electrical connections and the second pair of PTCRs being connected in series between the first and second pairs of transmit electrical connections.

26. The apparatus of claim 20 wherein the interconnection module comprises a cable ready RJ45 jack.

27. The apparatus of claim 20 wherein half of the receive electrical connections and half of the transmit electrical connections on the overvoltage protection module comprise insulation displacement contacts and half of the receive electrical connections and half of the transmit electrical connections on the overvoltage protection module comprise contacts in an RJ45 socket.

28. The apparatus of claim 20 wherein the interconnection module comprises a metallic structure having a generally horizontal base portion, a generally vertical middle portion with an aperture therein for receiving an electrical connector and a generally horizontal top portion, the structure having a Keptel footprint.

29. The apparatus of any of claims 20 through 28 further comprising telephone overvoltage protection apparatus mounted in the enclosure for being connected to telephone voice lines for protecting the voice lines from overvoltage conditions.

30. The apparatus of any of claims 20 through 28 further comprising a subscriber bridge module mounted in the enclosure for connecting telephone company and subscriber voice lines.

31. The apparatus of claim 30 wherein the subscriber bridge module comprises a socket having an electrical switch, the switch having two sets of first, second and third contacts, the first contacts of both sets for being connected to the telephone company line, the second contacts of both sets for being connected to the subscriber line, the first and second contacts of each set being normally connected in the absence of a plug in the socket, thereby connecting the telephone company and subscriber lines, the first contacts of both sets being disconnected from the second contacts of both sets and being connected to the third contacts of both sets when a plug is inserted in the socket, thereby disconnecting the telephone company line from the subscriber line and connecting the telephone company line to the third contacts of both sets which in turn connect with contacts in the plug and provide a demarcation point between the telephone company and subscriber lines, the current carrying capacity of the first and second contacts of both sets being greater than the current carrying capacity of the third contacts of both sets.

32. The apparatus of any of claims 20 through 28 further comprising:
　(a) telephone overvoltage protection apparatus mounted in the enclosure for being connected to telephone voice lines for protecting the voice lines from overvoltage conditions; and
　(b) a subscriber bridge module mounted in the enclosure for connecting the telephone company and subscriber lines.

33. The apparatus of claim 32 wherein the subscriber bridge module comprises a socket having an electrical switch, the switch having two sets of first, second and third contacts, the first contacts of both sets for being connected to the telephone company line, the second contacts of both sets for being connected to the subscriber line, the first and second contacts of each set being normally connected in the absence of a plug in the socket, thereby connecting the telephone company and subscriber lines, the first contacts of both sets being disconnected from the second contacts of both sets and being connected to the third contacts of both sets when a plug is inserted in the socket, thereby disconnecting the telephone company line from the subscriber line and connecting the telephone company line to the third contacts of both sets which in turn connect with contacts in the plug and provide a demarcation point between the telephone company and subscriber lines, the current carrying capacity of the first and second contacts of both sets being greater than the current carrying capacity of the third contacts of both sets.

34. The apparatus of any of claims 20 through 28 further comprising a coaxial connector mounted in the enclosure for interconnecting coaxial cables.

35. The apparatus of claim 34 further comprising an in-line coaxial surge arrestor comprising:
　(a) a hollow conductive housing;
　(b) insulating ends adapted to seal the housing;
　(c) an inert gas sealed in the housing;
　(d) a conductor extending through the housing, the conductor having a longitudinal axis oriented in a direction parallel to the direction of signal transmission; and
　(e) the diameter of the conductor being varied along at least a portion of the length of the conductor within the housing for matching the impedance of the surge arrestor to that of the coaxial cables.

36. The apparatus of any of claims 20 through 28 further comprising:
　(a) telephone overvoltage protection apparatus mounted in the enclosure for being connected to telephone voice lines for protecting the voice lines from overvoltage conditions;
　(b) a subscriber bridge module mounted in the enclosure for connecting the telephone company and subscriber voice lines; and
　(c) a coaxial connector mounted in the enclosure for interconnecting coaxial cables.

37. The apparatus of claim 36 wherein the subscriber bridge module comprises a socket having an electrical switch, the switch having two sets of first, second and third contacts, the first contacts of both sets for being connected to the telephone company line, the second contacts of both sets for being connected to the subscriber line, the first and second contacts of each set being normally connected in the absence of a plug in the socket, thereby connecting the telephone company and subscriber lines, the first contacts of both sets being disconnected from the second contacts of both sets and being connected to the third contacts of both sets when a plug is inserted in the socket, thereby disconnecting the telephone company line from the subscriber line and connecting the telephone company line to the third contacts of both sets which in turn connect with contacts in the plug and provide a demarcation point between the telephone company and subscriber lines, the current carrying capacity of the first and second contacts of both sets being greater than the current carrying capacity of the third contacts of both sets.

38. The apparatus of claim 36 further comprising an in-line coaxial surge arrestor comprising:
　(a) a hollow conductive housing;
　(b) insulating ends adapted to seal the housing;
　(c) an inert gas sealed in the housing;
　(d) a conductor extending through the housing, the conductor having a longitudinal axis oriented in a direction parallel to the direction of signal transmission; and
　(e) the diameter of the conductor being varied along at least a portion of the length of the conductor within the housing for matching the impedance of the surge arrestor to that of the coaxial cables.

* * * * *